(12) United States Patent
Saez et al.

(10) Patent No.: US 11,007,929 B2
(45) Date of Patent: May 18, 2021

(54) MULTIMODAL VEHICLE-TO-PEDESTRIAN NOTIFICATION SYSTEM

(71) Applicant: GM GLOBAL TECHNOLOGY OPERATIONS LLC, Detroit, MI (US)

(72) Inventors: Miguel A. Saez, Clarkston, MI (US); Marcus J. Huber, Saline, MI (US); Qinglin Zhang, Novi, MI (US); Lei Wang, Rochester Hills, MI (US); Sudhakaran Maydiga, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 58 days.

(21) Appl. No.: 16/425,871

(22) Filed: May 29, 2019

(65) Prior Publication Data

US 2020/0377012 A1 Dec. 3, 2020

(51) Int. Cl.
*B60Q 1/52* (2006.01)
*B60Q 5/00* (2006.01)
*G06K 9/00* (2006.01)
*B60W 30/095* (2012.01)

(52) U.S. Cl.
CPC .......... *B60Q 1/525* (2013.01); *B60Q 5/006* (2013.01); *B60W 30/0953* (2013.01); *B60W 30/0956* (2013.01); *G06K 9/00348* (2013.01); *G06K 9/00369* (2013.01); *G06K 9/00805* (2013.01)

(58) Field of Classification Search
CPC ... B60Q 1/525; B60Q 5/006; B60W 30/0953; B60W 30/0956; G06K 9/00369; G06K 9/00805; G06K 9/00348
See application file for complete search history.

(56) References Cited

U.S. PATENT DOCUMENTS

| | | | |
|---|---|---|---|
| 9,771,021 B1* | 9/2017 | Lindsay | B60Q 1/085 |
| 9,881,503 B1* | 1/2018 | Goldman-Shenhar | G05D 1/0088 |
| 10,414,336 B1* | 9/2019 | Harper | B60Q 5/006 |
| 2009/0160678 A1* | 6/2009 | Turnbull | B60Q 1/525 340/944 |
| 2011/0128161 A1* | 6/2011 | Bae | B60Q 5/006 340/901 |
| 2015/0035685 A1* | 2/2015 | Strickland | B60Q 1/525 340/901 |
| 2015/0329043 A1* | 11/2015 | Skvarce | B60R 21/34 340/435 |
| 2017/0270374 A1* | 9/2017 | Myers | G06K 9/00369 |

(Continued)

*Primary Examiner* — Ryan W Sherwin
(74) *Attorney, Agent, or Firm* — Cantor Colburn LLP

(57) ABSTRACT

A method for improving pedestrian safety is provided. The method includes determining operating conditions of a vehicle using a plurality of vehicle sensors. A path of the vehicle is predicted based on the determined operating conditions. Pedestrian parameters for a pedestrian in a vicinity of the vehicle are acquired using the plurality of vehicle sensors. The pedestrian parameters include at least one of a position, a speed of the pedestrian, gait, body posture and a level of distractedness. A determination is made whether a notification of the pedestrian is necessary based on the determined vehicle operating conditions and the acquired pedestrian parameters. A mode of notification of the pedestrian is selected from a plurality of modes of notification, in response to determining that the notification of the pedestrian is necessary. The pedestrian is notified using the selected mode of notification.

16 Claims, 4 Drawing Sheets

(56) References Cited

U.S. PATENT DOCUMENTS

| | | | | |
|---|---|---|---|---|
| 2018/0174460 A1* | 6/2018 | Jung | .................... | B60Q 1/525 |
| 2018/0257548 A1* | 9/2018 | Suzuki | .................... | B60Q 1/50 |
| 2019/0266859 A1* | 8/2019 | Song | .................... | G05D 1/0248 |
| 2020/0283012 A1* | 9/2020 | Kozak | .................... | B60W 50/14 |
| 2020/0307622 A1* | 10/2020 | Pomish | .................... | G08G 1/162 |

* cited by examiner

MULTIMODAL VEHICLE-TO-PEDESTRIAN NOTIFICATION SYSTEM

INTRODUCTION

The subject disclosure relates to systems and methods for detecting and obtaining information about objects around a vehicle, and more particularly relates to a multimodal vehicle-to-pedestrian notification system.

The travel of a vehicle along predetermined routes, such as on highways, roads, streets, paths, etc. can be affected by other vehicles, objects, obstructions, and pedestrians on, at or otherwise in proximity to the path. The circumstances in which a vehicle's travel is affected can be numerous and diverse. Vehicle communication networks using wireless technology have the potential to address these circumstances by enabling vehicles to communicate with each other and with the infrastructure around them. Connected vehicle technology (e.g., Vehicle to Vehicle (V2V) and Vehicle to Infrastructure (V2I) can alert motorists of roadway conditions or potential collisions. Connected vehicles can also "talk" to traffic signals, work zones, toll booths, school zones, and other types of infrastructure. Further, using either in-vehicle or after-market devices that continuously share important mobility information, vehicles ranging from cars to trucks and buses to trains are able to "talk" to each other and to different types of roadway infrastructure. In addition to improving inter-vehicle communication, connected V2V and V2I applications have the potential to impact broader scenarios, for example, Vehicle to Pedestrian (V2P) communication.

Accordingly, it is desirable to utilize V2P communication to improve pedestrian safety.

SUMMARY

In one exemplary embodiment described herein is a method for improving pedestrian safety. The method includes determining operating conditions of a vehicle using a plurality of vehicle sensors. A path of the vehicle is predicted based on the determined operating conditions. Pedestrian parameters for a pedestrian in a vicinity of the vehicle are acquired using the plurality of vehicle sensors. The pedestrian parameters include at least one of a position of the pedestrian, a speed of the pedestrian, a gait of the pedestrian, a body posture of the pedestrian and a level of distractedness of the pedestrian. A determination is made whether a notification of the pedestrian is necessary based on the determined vehicle operating conditions and the acquired pedestrian parameters. A mode of notification of the pedestrian is selected from a plurality of modes of notification, in response to determining that the notification of the pedestrian is necessary. The notification is sent to the pedestrian using the selected mode of notification.

In addition to one or more of the features described above, or as an alternative, further embodiments of the method may include that changes in the pedestrian parameters are evaluated based on the sent notification. A different mode of notification of the pedestrian is selected from the plurality of modes of notification, in response to determining that the sent notification was not effective.

In addition to one or more of the features described above, or as an alternative, further embodiments of the method may include that the plurality of modes of notification include at least a visual notification, an audio notification, a haptic output notification, and a wireless alert notification.

In addition to one or more of the features described above, or as an alternative, further embodiments of the method may include that the visual notification includes a vehicle spotlight notification indicating to the pedestrian a safe distance between the vehicle and the pedestrian.

In addition to one or more of the features described above, or as an alternative, further embodiments of the method may include that position, shape, color and transmission frequency of the vehicle spotlight notification changes dynamically based on at least the position of a pedestrian, vehicle operating conditions, current direction of travel of the vehicle, the predicted path of the vehicle and positions of relevant objects in the vicinity of the vehicle.

In addition to one or more of the features described above, or as an alternative, further embodiments of the method may include that the visual notification includes at least a projected vehicle path notification indicating to the pedestrian the predicted path of the vehicle, a visual opening door indicator and a visual danger zone indicator.

In addition to one or more of the features described above, or as an alternative, further embodiments of the method may include that the visual notification changes dynamically based on at least the speed of the vehicle, vehicle operating conditions, current direction of travel of the vehicle, the predicted path of the vehicle and positions of relevant objects in the vicinity of the vehicle.

In addition to one or more of the features described above, or as an alternative, further embodiments of the method may include that determining operating conditions of the vehicle includes scanning vehicle surrounding conditions using the plurality of vehicle sensors.

In addition to one or more of the features described above, or as an alternative, further embodiments of the method may include that determining the operating conditions of the vehicle includes obtaining at least Vehicle to Infrastructure (V2I) information, Global Positioning System (GPS) navigational-type data and traffic information.

In addition to one or more of the features described above, or as an alternative, further embodiments of the method may include that determining whether the notification of the pedestrian is necessary further comprises determining whether the predicted path of the vehicle intersects with a path of the pedestrian using the determined vehicle operating conditions and the acquired pedestrian parameters and determining whether the level of distractedness of the pedestrian exceeds a predefined threshold, in response to determining that the predicted path of the vehicle intersects with the path of the pedestrian.

Also described herein is another embodiment that is a multimodal system for improving pedestrian safety. The system includes a plurality of vehicle sensors disposed on a vehicle. The plurality of sensors is operable to obtain information related to vehicle operating conditions and related to an environment surrounding the vehicle. The system further includes an image projection system disposed on the vehicle. The image projection system is operable to project an image on a surface in a vicinity of the vehicle. The system also includes an audio device disposed on the vehicle. The audio device is operable to render audio notifications in the vicinity of the vehicle. The system further includes a wireless communication device disposed on the vehicle. The wireless communication device is operable to send a wireless alert notification to one or more pedestrians located in the vicinity of the vehicle. The system also includes a vehicle information system operatively coupled to the plurality of vehicle sensors, the image projection system, the audio device and the wireless communication device.

The vehicle information system is configured to determine the operating conditions of the vehicle using the plurality of vehicle sensors. A path of the vehicle is predicted based on the determined operating conditions. Pedestrian parameters for a pedestrian in the vicinity of the vehicle are acquired using the plurality of vehicle sensors. The pedestrian parameters include at least one of a position of the pedestrian, a speed of the pedestrian, a gait of the pedestrian, a body posture of the pedestrian and a level of distractedness of the pedestrian. A determination is made whether a notification of the pedestrian is necessary based on the determined vehicle operating conditions and the acquired pedestrian parameters. A mode of notification of the pedestrian is selected from a plurality of modes of notification, in response to determining that the notification of the pedestrian is necessary. The notification is sent to the pedestrian using the selected mode of notification.

In addition to one or more of the features described above, or as an alternative, further embodiments of the system may include that the vehicle information system is configured to evaluate changes in the pedestrian parameters based on the sent notification. A different mode of notification of the pedestrian is selected from the plurality of modes of notification, in response to determining that the sent notification was not effective.

In addition to one or more of the features described above, or as an alternative, further embodiments of the system may include that the plurality of modes of notification include at least a visual notification, an audio notification, a haptic output notification and the wireless alert notification.

In addition to one or more of the features described above, or as an alternative, further embodiments of the system may include that the visual notification includes a vehicle spotlight notification projected by the image projection system, the vehicle spotlight notification indicating to the pedestrian a safe distance between the vehicle and the pedestrian.

In addition to one or more of the features described above, or as an alternative, further embodiments of the system may include that position, shape, color and transmission frequency of the vehicle spotlight notification changes dynamically based on at least the position of a pedestrian, vehicle operating conditions, current direction of travel of the vehicle, the predicted path of the vehicle and positions of relevant objects in the vicinity of the vehicle.

In addition to one or more of the features described above, or as an alternative, further embodiments of the system may include that the visual notification includes a projected vehicle path notification projected by the image projection system, a visual opening door indicator and a visual danger zone indicator. The projected vehicle path indicating to the pedestrian the predicted path of the vehicle.

In addition to one or more of the features described above, or as an alternative, further embodiments of the system may include that the visual notification changes dynamically based on at least the speed of the vehicle, the vehicle operating conditions, current direction of travel of the vehicle, the predicted path of the vehicle and positions of relevant objects in the vicinity of the vehicle.

In addition to one or more of the features described above, or as an alternative, further embodiments of the system may include that the vehicle information system configured to determine the operating conditions of the vehicle is further configured to scan vehicle surrounding conditions using the plurality of vehicle sensors.

In addition to one or more of the features described above, or as an alternative, further embodiments of the system may include that the vehicle information system configured to determine the operating conditions of the vehicle is further configured to obtain at least Vehicle to Infrastructure (V2I) information, Global Positioning System (GPS) navigational-type data, traffic information.

In addition to one or more of the features described above, or as an alternative, further embodiments of the system may include that the vehicle information system configured to determine whether the notification of the pedestrian is necessary is further configured to determine whether the predicted path of the vehicle intersects with a path of the pedestrian using the determined vehicle operating conditions and the acquired pedestrian parameters and configured to determine whether the level of distractedness of the pedestrian exceeds a predefined threshold, in response to determining that the predicted path of the vehicle intersects with the path of the pedestrian.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
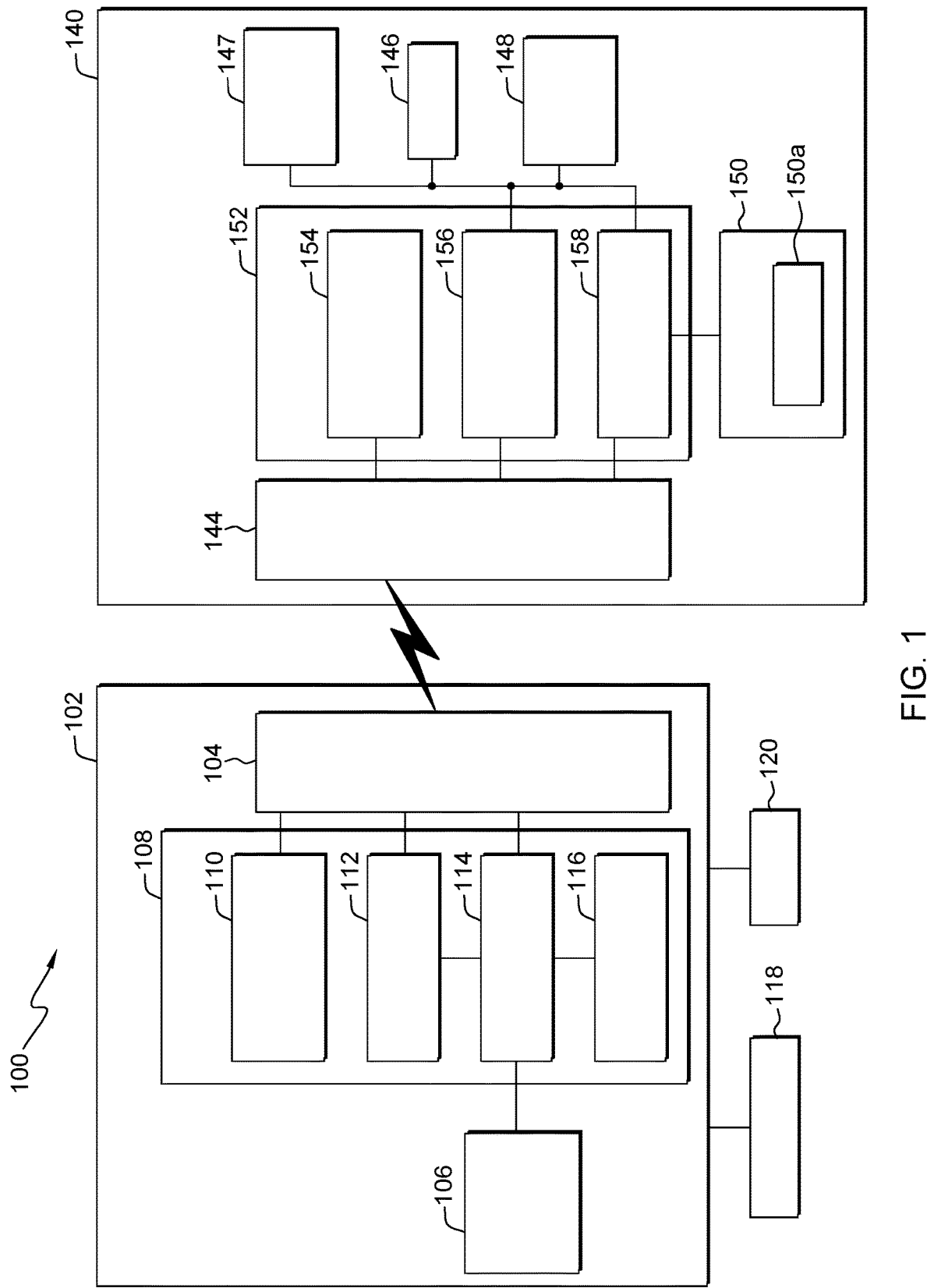
FIG. 1 is a block diagram of a configuration of an in-vehicle information system in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The following discussion generally relates to a system for detecting and obtaining information about objects around a vehicle. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to vehicle information systems, V2P communication, automotive exteriors and the like need not be described in detail herein.

In accordance with an exemplary embodiment described herein is an in-vehicle information system and a method of using a multimodal communication system for detecting and alerting pedestrians who may be too distracted, inattentive, or otherwise unaware to notice the operational mode of a nearby vehicle. In an embodiment, to construct a model of the environment surrounding the corresponding vehicle, the in-vehicle information system collects data from a variety of sensors (e.g., light detection and ranging (LIDAR), monocular or stereoscopic cameras, radar, and the like) that are mounted to at least one end of the vehicle, analyzes this data to determine the positions and motion properties of relevant objects (obstacles) in the environment. The term "relevant objects" is used herein broadly to include, for example, other vehicles, cyclists, pedestrians, and animals. (There may also be objects in the environment that are not relevant, such as small roadside debris, vegetation, poles, curbs, traffic cones, and barriers.) In an embodiment, the in-vehicle information system may also rely on infrastructure information gathered by vehicle-to-infrastructure communication.

FIG. 1 is a block diagram of a configuration of an in-vehicle information system in accordance with an exemplary embodiment. As illustrated in FIG. 1, because an in-vehicle device 100 includes an in-vehicle information system 102 which communicates with a pedestrian's portable device 140, the respective devices are explained.

A configuration of in-vehicle information system 102 is explained first. As illustrated in FIG. 1, the in-vehicle information system 102 includes a communicating unit 104, a visual notification operating unit 106, and a controller 108, and is connected to a vehicle control system (hereinafter, "VC system") unit 118 and an audio speaker or buzzer system 120.

The VC system unit 118 is connected to the in-vehicle information system 102 and includes various sensors that detect a state of the vehicle, such as a vehicle speed sensor, an acceleration sensor, a steering sensor, and a brake sensor to detect speed of the vehicle (car speed), acceleration of the vehicle, positions of tires of the vehicle, and a state of the brake. The audio speaker or buzzer system 120 outputs an audio notification, as described herein.

Returning to the configuration of the in-vehicle information system 102, once a distracted pedestrian or another relevant object is detected, the communicating unit 104 establishes a communication link with the pedestrian's portable device 140, for example, by using short-distance wireless communication such as Bluetooth. The communicating unit 104 facilitates communication between the in-vehicle information system 102 and the portable device 140 by using the established communication link. Bluetooth is a short-distance wireless-communications standard to perform wireless communication in a radius of about dozens of meters by using a frequency band of 2.4 gigahertz. Bluetooth is widely applied to electronic devices such as mobile telephones and personal computers.

In accordance with the exemplary embodiment, while a case that communication between the in-vehicle information system 102 and the portable terminal 140 is performed by using Bluetooth is explained, other wireless communications standard such as Wi-Fi and ZigBee can be also used. Alternatively, wireless messaging communication can be also performed between the in-vehicle information system 102 and the portable device 140.

The visual notification operating unit 106 is connected to the controller 108, and also connected to a vehicle exterior ground projection system via a notification controller 114 in the controller 108. The visual notification operating unit 106 controls visual notifications described below.

The controller 108 includes an internal memory for storing a control program such as an operating system (OS), a program specifying various process procedures, and required data, and also includes a wireless-communication establishing unit 110, an information acquiring unit 112, the notification controller 114, and an operation receiving unit 116 to perform various types of processes by these units.

When having detected a portable device of a pedestrian positioned at a predetermined distance allowing wireless communication with the in-vehicle information system 102, the wireless-communication establishing unit 110 establishes wireless communication with the detected portable device 140. Specifically, when the power of the in-vehicle device 100 is turned on, the wireless-communication establishing unit 110 activates the communicating unit 104, and searches whether there is a terminal in an area allowing wireless communication. When the portable device 140 enters an area allowing wireless communication, the wireless-communication establishing unit 110 detects the approaching portable device 140, and performs a pairing process using the communicating unit 104 with respect to the detected portable device 140, thereby establishing wireless communication with the portable device 140.

The information acquiring unit 112 acquires various types of data provided by various sensors. Specifically, the information acquiring unit 112 acquires, for example, vehicle operating conditions, V2V information and V2I information described in greater detail herein.

When having detected the distracted pedestrian, the notification controller 114 selects one of the available communication modes and renders pedestrian notification via at least one of the visual notification operating unit 106 and the audio speaker or buzzer system 120. Specifically, the notification controller 114 may instruct the visual notification operating unit 106 to output a visual warning to the distracted pedestrian, using a spotlight or a laser projection system discussed herein. Further, in some embodiments the notification controller 114 selects to output a notification audio signal from the audio speaker or buzzer system 120. Additional modes of notification may include, but are not limited to, a haptic output notification and a wireless alert notification.

A configuration of the pedestrian's portable device 140 is explained next. In various embodiments, the portable device 140 may include but is not limited to any of the following: a smart watch, digital computing glasses, a digital bracelet, a mobile internet device, a mobile web device, a smartphone, a tablet computer, a wearable computer, a head-mounted display, a personal digital assistant, an enterprise digital assistant, a handheld game console, a portable media player, an ultra-mobile personal computer, a digital video camera, a mobile phone, a personal navigation device, and the like. As illustrated in FIG. 1, the exemplary portable device 140 may include a communicating unit 144, a speaker 146, a haptic notification control unit 147, a display operating unit 148, a storage unit 150, and a controller 152.

The communicating unit 144 establishes a communication link with the in-vehicle information system 102 by using, for example, the short-distance wireless communication such as Bluetooth as in the communicating unit 104 of the in-vehicle information system 102 and performs communication between the portable device 140 and the in-vehicle information system 102 by using the established communication link.

The haptic notification control unit 147 is configured to generate haptic notifications. Haptics is a tactile and force feedback technology that takes advantage of a user's sense of touch by applying haptic feedback effects (i.e., "haptic effects" or "haptic feedback"), such as forces, vibrations, and motions, to the user. The portable device 140 can be configured to generate haptic effects. In general, calls to embedded hardware capable of generating haptic effects can be programmed within an operating system ("OS") of the device portable device 140. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware of the haptic notification control unit 147 then produces the appropriate haptic effect.

Upon reception of the notification signal/message by application execution controller 156 or information notifying unit 158 in the controller 152 described later, the display operating unit 148, which may include an input/output device such as a touch panel display, displays a text or an image received from the application execution controller 156 or the information notifying unit 158 in the controller 152.

The storage unit 150 stores data and programs required for various types of processes performed by the controller 152, and stores, for example, an application 150a to be read and executed by the application execution controller 156. The application 150a is, for example, the navigation application, a music download application, or a video distribution application.

The controller 152 includes an internal memory for storing a control program such as an operating system (OS), a program specifying various process procedures, and required data to perform processes such as audio communication, and also includes a wireless-communication establishing unit 154, the application execution controller 156, and the information notifying unit 158 to perform various types of processes by these units.

A wireless-communication establishing unit 154 establishes wireless communication with the in-vehicle information system 102. Specifically, when a pairing process or the like is sent from the in-vehicle information system 102 via the communicating unit 144, the wireless-communication establishing unit 154 transmits a response with respect to the process to the in-vehicle information system 102 to establish wireless communication.

The application execution controller 156 receives one or more instructions from a user of the portable device 140, and reads an application corresponding to the received instruction from the storage unit 150 to execute the application. For example, upon reception of an activation instruction of the navigation application from the user of the portable device 140, the application execution controller 156 reads the navigation application from the storage unit 150 to execute the navigation application.

Figure 2A:
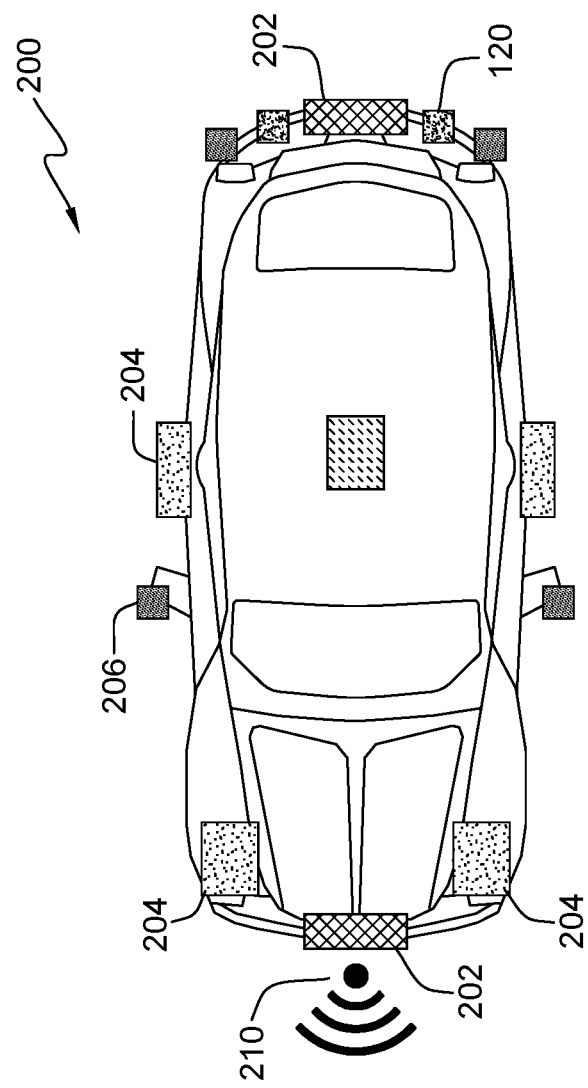
FIG. 2A is an example diagram of a vehicle having equipment for notifying distracted pedestrians in accordance with an exemplary embodiment.
Figure 2A:
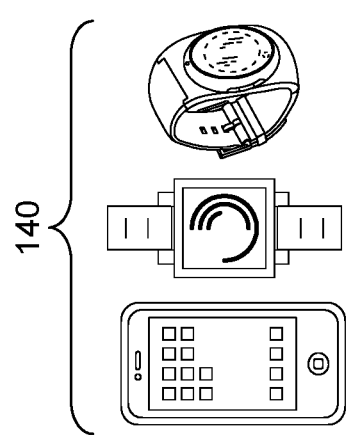

Referring to the exemplary automobile 200 illustrated in FIG. 2A, vehicular equipment coupled to the automobile 200 generally provides various modes of communicating with distracted pedestrians. As shown, the exemplary automobile 200 may include an exterior projection system, such as, one or more laser projection devices 202, other types of projection devices 206, spotlight digital projectors 204, and the like. The exemplary automobile may further include the audio speaker or buzzer system 120 and wireless communication devices 210. In an embodiment, the in-vehicle information system 102 employs the vehicle exterior projection system to project highly targeted images, pictures, spotlights and the like to improve safety of all relevant objects around the vehicle 200.

Still referring to the exemplary automobile 200 illustrated in FIG. 2A, the vehicle exterior ground projection system may include one or more projection devices 202, 206 (including laser projection devices 202) coupled to automobile 200 and configured to project an image onto a display surface that is external to automobile 200. The display surface may be any external surface. In one embodiment, the display surface is a region on the ground adjacent the automobile, or anywhere in the vicinity of the vehicle; in front, back, the hood, and the like.

The projected image may include any combination of images, pictures, video, graphics, alphanumerics, messaging, test information, other indicia relating to safety of relevant objects (e.g., distracted pedestrians) around vehicle 200. FIG. 2C is an example of a visual notification projected by laser projection devices 202 to notify all relevant objects of potential safety concerns in accordance with an exemplary embodiment. In various embodiments, in-vehicle information system 102 coupled with the vehicle exterior projection system may project images and render audible information associated with the vehicle's trajectory, and operation. For example, providing a visual and audible indication that vehicle 200 is moving forward, backward, door opening, visual indicator of a danger zone, "Turning Left" and the like, as well as illuminating the intended path of the vehicle. Exemplary image 220 (as shown in FIG. 2C) may include a notification to a passing pedestrian or bicyclist. For example, image 220 displayed in the front or rear of vehicle 200 (as shown in FIG. 2C) may illuminate and indicate the intended trajectory of vehicle 200. In various embodiments, the graphics (e.g., image, shape, color and transmission frequency) used for visual notification can change dynamically based on the speed of the vehicle 200, vehicle operating conditions (mode and context), current direction of travel of the vehicle 200, objects around the vehicle 200 and the like.

According to an embodiment, the vehicle exterior projection system may further include at least one spotlight digital projector 204 coupled to vehicle 200. Preferentially, spotlight digital projectors 204 are aligned in order to project a spotlight so that said spotlight is visible to the relevant objects when it strikes a suitable projection surface. Such a projection surface will generally be located outside of the motor vehicle 200; more preferably it can be a roadway surface, a wall or the like. Practically, at least one headlamp and/or at least one rear spotlight of vehicle 200 can be designed as said spotlight digital projector 204 in order to render the spotlight visible on a surface lit up by headlamp/spotlight projector 204.

As shown in FIG. 2A, spotlight digital projectors 204 may be located at different sides of vehicle 200. In one embodiment, visual notification operating unit 106 can be practically set up to select spotlight digital projector 204 on the right side of vehicle 200 for projecting the spotlight when the distracted pedestrian is detected on the right side of vehicle 200, and to select spotlight digital projector 204 on the left side of vehicle 200 when the distracted pedestrian is detected on the left side of vehicle 200. Thus, the probability is high that the spotlight in each case is visible in the direction in which the distracted pedestrian happens to be looking.

Figure 2B:
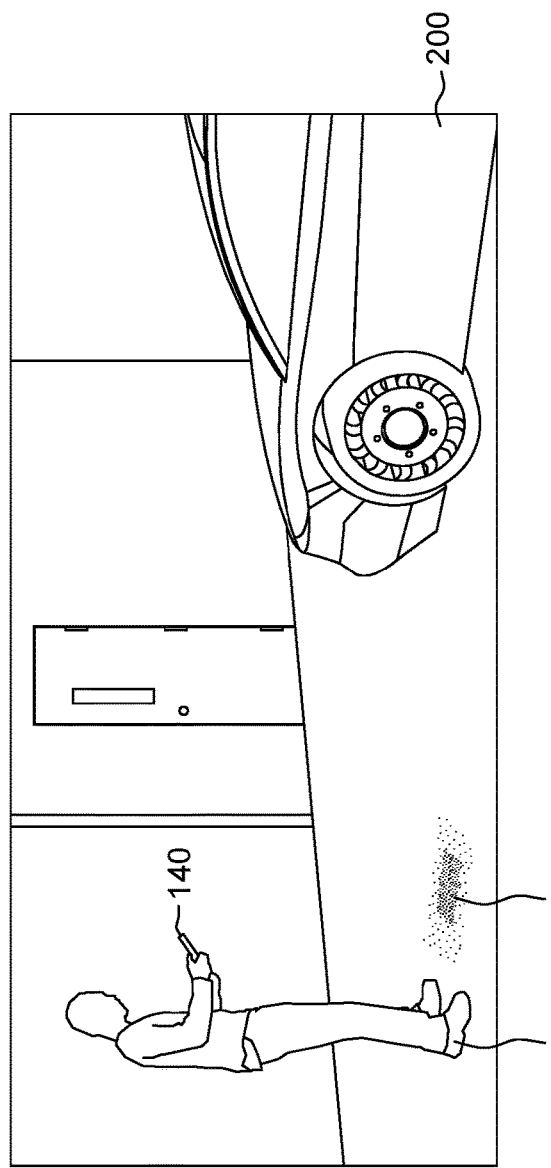
FIG. 2B is an example diagram illustrating visual notification in accordance with an exemplary embodiment.
Figure 2C:
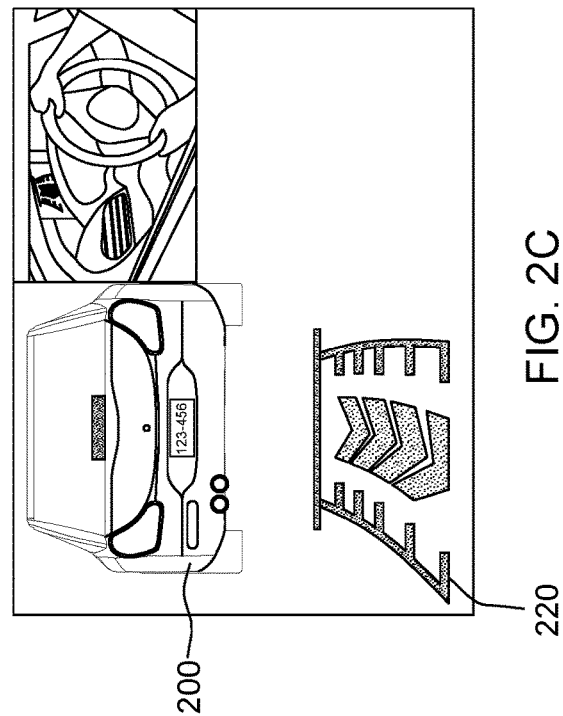
FIG. 2C is an example diagram illustrating alternative visual notification in accordance with an exemplary embodiment.

FIG. 2B is an example of a visual notification in a form of spotlight image 214 projected by spotlight digital projector 204. Spotlight image 214 shown in FIG. 2B indicates to distracted pedestrian 216 (or any other relevant object) the safe distance to vehicle 200. In one embodiment, visual notification operating unit 106 can determine a desirable location of the projected spotlight image based on the relative position of detected pedestrian 216. In other words, visual notification operating unit 106 is capable of moving the position of the visual notification spotlight image to actively track the position of the pedestrian.

Referring again to exemplary automobile 200 illustrated in FIG. 2A, in various embodiments, in-vehicle information system 102 may further render audible information associated with the vehicle's trajectory and operation to alert relevant objects to the presence of moving vehicle 200. In one embodiment, audio speaker or buzzer system 120 may be coupled to vehicle 200. Such audio speaker or buzzer system 120 may be used by in-vehicle information system 102 to notify relevant objects of a possible collision situation. Audio speaker or buzzer system 120 may be activated independently of the vehicle exterior projection system. In some embodiments, if in-vehicle information system 102 establishes a communication session with pedestrian's portable device 140 and determines that distracted pedestrian 216 (shown in FIG. 2B) is listening to music, simultaneously with activating audio speaker or buzzer system 120, notification controller 114 may send instructions to controller 152 of pedestrian's portable device 140 to temporarily mute or turn off the music distracted pedestrian 216 happens to be listening to. It should be noted that various notification modes discussed herein can be used separately or in any combination, including the use of all three notification modes (image projection, spotlight projection and audible notifications).

As shown in FIG. 2A, in-vehicle information system 102 (shown in FIG. 1) may also be coupled to one or more wireless communication devices 210. Wireless communication device 210 may include a transmitter and a receiver, or a transceiver of the vehicle 200. Wireless communication device 210 may be used by communicating unit 104 of the in-vehicle information system 102 (shown in FIG. 1) to establish a communication channel between vehicle 200 and pedestrian's portable device 140. The communication channel between portable device 140 and vehicle 200 may be any type of communication channel, such as, but not limited to, dedicated short-range communications (DSRC), Bluetooth, WiFi, Zigbee, cellular, WLAN, etc. The DSRC communications standard supports communication ranges of 400 meters or more.

Figure 3:
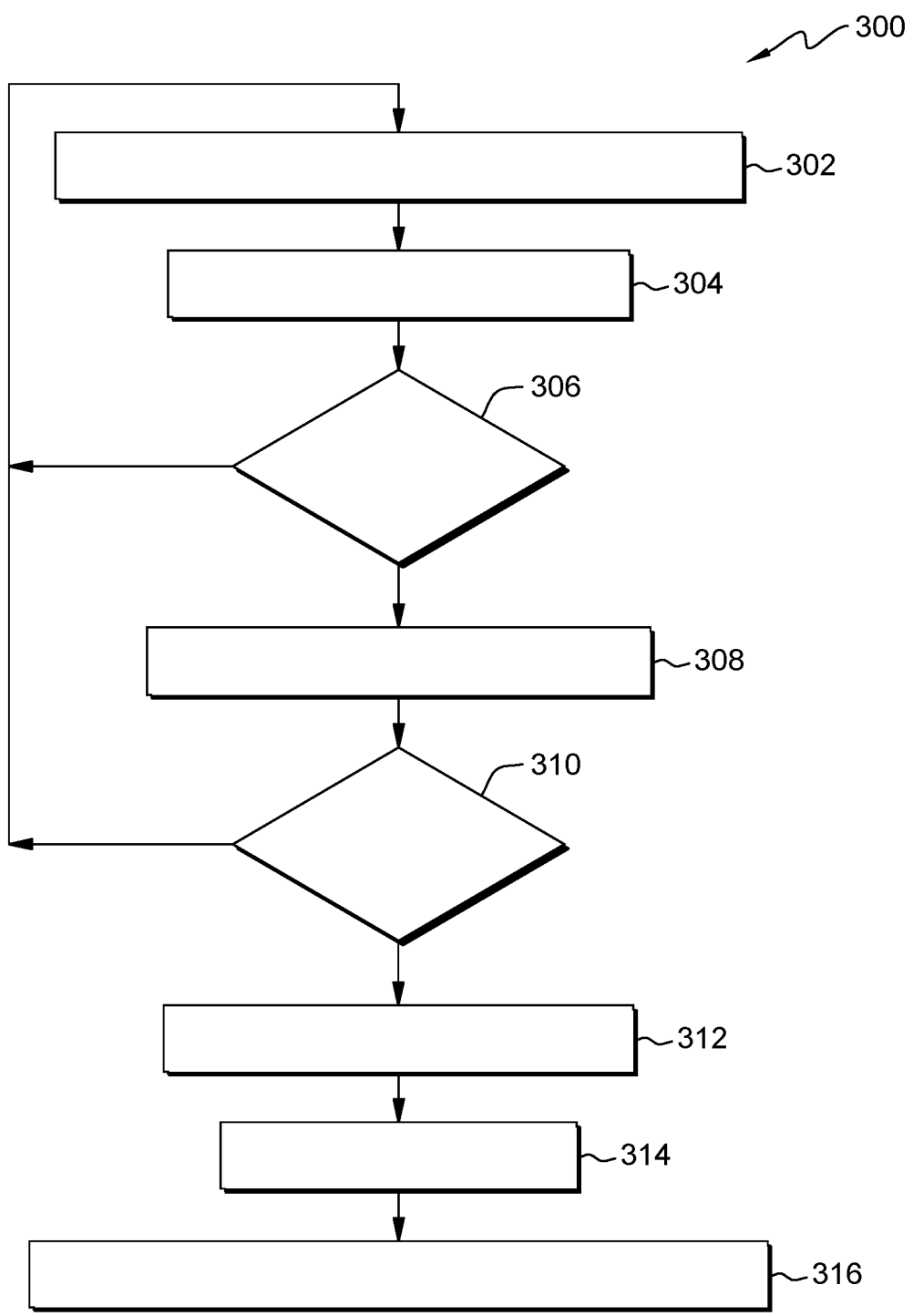
FIG. 3 is a flowchart of a process that may be employed for implementing one or more exemplary embodiments.

Referring to FIG. 3, there is shown a flowchart 300 of a process that may be employed for implementing one or more exemplary embodiments. At block 302, information acquiring unit 112 determines operating conditions of the vehicle 200. Vehicle operating conditions may include, but are not limited to, engine speed, vehicle speed and ambient temperature. Further, operating conditions may include selecting a route to a destination based on driver input or by matching a present driving route to driving routes taken during previous trips. The operating conditions may be determined or inferred from a plurality of sensors employed by VC system unit 118.

In some embodiments, information acquiring unit 112 also takes advantage of other sources, external to vehicle 200, to collect information about the environment. The use of such sources allows information acquiring unit 112 to collect information that may be hidden from the plurality of sensors (e.g., information about distant objects or conditions outside the range of sensors), and/or to collect information that may be used to confirm (or contradict) information obtained by the plurality of sensors. For example, in-vehicle information system 102 may include one or more interfaces (not shown in FIG. 1) that are configured to receive wireless signals using one or more "V2X" technologies, such as V2V and V2I technologies. In an embodiment in which in-vehicle information system 102 is configured to receive wireless signals from other vehicles using V2V, for example, information acquiring unit 112 may receive data sensed by one or more sensors of one or more other vehicles, such as data indicating the configuration of a street, or the presence and/or state of a traffic control indicator, etc. In an example embodiment in which in-vehicle information system 102 is configured to receive wireless signals from infrastructure using V2I, information acquiring unit 112 may receive data provided by infrastructure elements having wireless capability, such as dedicated roadside stations or "smart" traffic control indicators (e.g., speed limit postings, traffic lights, etc.), for example. The V2I data may be indicative of traffic control information (e.g., speed limits, traffic light states, etc.), objects or conditions sensed by the stations, or may provide any other suitable type of information (e.g., weather conditions, traffic density, etc.). In-vehicle information system 102 may receive V2X data simply by listening/scanning for the data or may receive the data in response to a wireless request sent by in-vehicle information system 102, for example. More generally, in-vehicle information system 102 may be configured to receive information about external objects and/or conditions via wireless signals sent by any capable type of external object or entity, such as an infrastructure element (e.g., a roadside wireless station), a commercial or residential location (e.g., a locale maintaining a WiFi access point), etc. In various embodiments, the information about the environment may further include Global Positioning System (GPS) navigational-type data, traffic information, and the like.

At least in some embodiments, at block 302, information acquiring unit 112 may determine if vehicle movement is expected based on the collected data. In addition, information acquiring unit 112 may scan the environmental scene around vehicle 200 using one or more sensors. One such sensor is a light detection and ranging (LIDAR) device. A LIDAR device actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The LIDAR device can be rapidly and repeatedly scanned across a scene to provide continuous real-time information on distances to reflective objects in the scene. Combining the measured distances and the orientation of the laser(s) of the LIDAR system while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

According to an embodiment of the present invention, at block 304, information acquiring unit 112 predicts a potential path of travel of vehicle 200. Information acquiring unit 112 may utilize conventional methods of lane geometry determination and vehicle position determination including sensor inputs based upon vehicle kinematics, camera or vision system data, and global positioning/digital map data. In an additional embodiment, radar data may be used in combination or alternatively to the sensor inputs described herein. It will be appreciated, that the potential paths of travel for the vehicle include multiple points descriptive of a potential safe passage for vehicle travel. The potential paths of travel can be combined or fused in one or more different combinations to determine a projected path of travel for the vehicle. In one embodiment, the potential paths of travel may be combined using weights to determine a projected path of travel for vehicle 200. For example, a potential path of travel for vehicle 200 determined using global positioning/digital map data may be given greater weight than a potential path of travel determined using vehicle kinematics in predetermined situations.

At block 306, information acquiring unit 112 processes and analyzes images and other data captured by scanning the environment to identify objects and/or features in the environment surrounding vehicle 200. The detected features/objects can include traffic signals, road way boundaries, other vehicles, pedestrians, and/or obstacles, etc. Information acquiring unit 112 can optionally employ an object recognition algorithm, a Structure From Motion (SFM) algorithm, video tracking, and/or available computer vision techniques to effect categorization and/or identification of detected features/objects. In some embodiments, information acquiring unit 112 can be additionally configured to differentiate between pedestrians and other detected objects and/or obstacles. In one exemplary embodiment, portable device 140 may be a V2P communication device. Accordingly, at block 306, wireless communication establishing unit 110 may receive a message from a pedestrian equipped with a V2P device. In one embodiment, the message received at block 306 may simply include an indication that there is a pedestrian in the vicinity of vehicle 200.

Responsive to detecting a pedestrian (decision block 306, "Yes" branch), at block 308, information acquiring unit 112 acquires one or more pedestrian parameters for the pedestrian in the vicinity of the vehicle, such as the GPS coordinates of the pedestrian, the heading, speed or movement pattern of the pedestrian, gait of the pedestrian, body posture of the pedestrian, the distraction level of the pedestrian, or other like parameters.

According to an embodiment of the present invention, at block 310, notification controller 114 determines if pedestrian notification is necessary. For example, notification controller 114 may use the parameters acquired at block 308 to predict a pedestrian path. Prediction of a pedestrian path at block 310 and prediction of a vehicle path at block 304 may include a preliminary analysis to determine whether there is any possibility of a collision between the pedestrian and the vehicle. Accordingly, steps performed at block 310 may include performing analysis to determine the probability of a collision between a vehicle and two or more distinct pedestrians. For example, if multiple pedestrians are predicted to have a path that will intersect with a predicted path of the vehicle, the steps at block 310 may include determining the pedestrian with the highest probability of intersecting the predicted path of the vehicle. In addition, at block 310, notification controller 114 may determine whether the level of distractedness of the pedestrian exceeds a predefined threshold, in response to determining that the path of the vehicle intersects with the path of the pedestrian.

Responsive to determining that pedestrian notification is necessary (decision block 310, "Yes" branch), at block 312, notification controller 114 selects a particular mode of pedestrian notification. In various embodiments, alternative modes of notification can include, but are not limited to, communication via tactile, audio, visual, portable device and the like. For example, notification controller 114 may first select visual communication, such as spotlight projection. If no pedestrian is detected (decision block 306, "No" branch) or, in response to determining that pedestrian notification is not necessary (decision block 310, "No" branch), the process returns to block 302.

At block 314, notification controller 114 notifies the pedestrian using the selected mode of notification. For example, notification controller 114 may engage visual notification operating unit 106 to project spotlight image 214 (as shown in FIG. 2B) using spotlight digital projector 204 to notify a distracted pedestrian (like pedestrian 216 in FIG. 2B) of potential collision with the vehicle in accordance with an exemplary embodiment.

At block 316, notification controller 114 may receive a new set of pedestrian parameters acquired by information acquiring unit 112 and may evaluate changes in the pedestrian parameters. For example, notification controller 114 may analyze the changes in the pedestrian parameters to determine whether the notification sent at block 314 was effective and whether collision with the distracted pedestrian can be avoided now. In case notification controller 114 determines that another pedestrian notification is necessary (e.g., if the previous notification was not effective), notification controller 114 may repeat steps performed at blocks 312-316, picking a different notification mode each time, until one of the notifications alters pedestrian's behavior to improve their safety. For instance, notification controller 114 may try projecting vehicle's path (as shown in FIG. 2C), activating audio notification or sending wireless communication using communicating unit 104 directly to the pedestrian's portable device 140. In one embodiment, the wireless communication may include V2P communication. As noted above, various notification modes can be used separately or in any combination.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for improving pedestrian safety, the method comprising:
    determining operating conditions of a vehicle using a plurality of vehicle sensors;
    predicting a path of the vehicle based on the determined operating conditions;
    acquiring pedestrian parameters for a pedestrian in a vicinity of the vehicle using the plurality of vehicle sensors, the pedestrian parameters including at least one of a position of the pedestrian, a speed of the pedestrian, a gait of the pedestrian, a body posture of the pedestrian and a level of distractedness of the pedestrian;
    determining whether a notification of the pedestrian is necessary based on the determined vehicle operating conditions and the acquired pedestrian parameters;
    selecting a mode of notification of the pedestrian from a plurality of modes of notification including at least one of a visual notification, an audio notification, a haptic output notification, and a wireless alert notification, in response to determining that the notification of the pedestrian is necessary;

sending a notification to the pedestrian using the selected mode of notification;

evaluating a pedestrian response to the notification in the selected mode of notification; and sending a notification in a different mode of notification if the pedestrian did not respond to the notification in the selected mode of notification.

2. The method of claim 1, wherein the visual notification includes a vehicle spotlight notification indicating to the pedestrian a safe distance between the vehicle and the pedestrian.

3. The method of claim 2, wherein position, shape, color and transmission frequency of the vehicle spotlight notification changes dynamically based on at least the position of a pedestrian, vehicle operating conditions, current direction of travel of the vehicle, the predicted path of the vehicle and positions of relevant objects in the vicinity of the vehicle.

4. The method of claim 3, wherein the visual notification includes at least a projected vehicle path notification indicating to the pedestrian the predicted path of the vehicle, a visual opening door indicator and a visual danger zone indicator.

5. The method of claim 4, wherein the visual notification changes dynamically based on at least the speed of the vehicle, vehicle operating conditions, current direction of travel of the vehicle, the predicted path of the vehicle and positions of relevant objects in the vicinity of the vehicle.

6. The method of claim 1, wherein determining the operating conditions of the vehicle includes scanning vehicle surrounding conditions using the plurality of vehicle sensors.

7. The method of claim 1, wherein determining the operating conditions of the vehicle includes obtaining at least Vehicle to Infrastructure (V2I) information, Global Positioning System (GPS) navigational-type data and traffic information.

8. The method of claim 1, wherein determining whether the notification of the pedestrian is necessary further comprises determining whether the predicted path of the vehicle intersects with a path of the pedestrian using the determined vehicle operating conditions and the acquired pedestrian parameters and determining whether the level of distractedness of the pedestrian exceeds a predefined threshold, in response to determining that the predicted path of the vehicle intersects with the path of the pedestrian.

9. A multimodal system for improving pedestrian safety, the multimodal system comprising:

a plurality of vehicle sensors disposed on a vehicle, the plurality of sensors operable to obtain information related to vehicle operating conditions and related to an environment surrounding the vehicle;

an image projection system disposed on the vehicle, the image projection system operable to project an image on a surface in a vicinity of the vehicle;

an audio device disposed on the vehicle, the audio device operable to render audio notifications in the vicinity of the vehicle;

a wireless communication device disposed on the vehicle, the wireless communication device operable to send a wireless alert notification to one or more pedestrians located in the vicinity of the vehicle;

a vehicle information system operatively coupled to the plurality of vehicle sensors, the image projection system, the audio device and the wireless communication device, the vehicle information system configured to:

determine the operating conditions of the vehicle using the plurality of vehicle sensors;

predict a path of the vehicle based on the determined operating conditions;

acquire pedestrian parameters for a pedestrian in the vicinity of the vehicle using the plurality of vehicle sensors, the pedestrian parameters including at least one of a position of the pedestrian, a speed of the pedestrian, a gait of the pedestrian, a body posture of the pedestrian and a level of distractedness of the pedestrian;

determine whether a notification of the pedestrian is necessary based on the determined vehicle operating conditions and the acquired pedestrian parameters;

select a mode of notification of the pedestrian from a plurality of modes of notification including at least one of a visual notification, an audio notification, a haptic output notification, and a wireless alert notification, in response to determining that the notification of the pedestrian is necessary;

send a notification to the pedestrian using the selected mode of notification evaluate a pedestrian response to the notification in the selected mode of notification; and send a notification in a different mode of notification if the pedestrian did not respond to the notification in the selected mode of notification.

10. The multimodal system of claim 9, wherein the visual notification includes a vehicle spotlight notification projected by the image projection system, the vehicle spotlight notification indicating to the pedestrian a safe distance between the vehicle and the pedestrian.

11. The multimodal system of claim 10, wherein position, shape, color and transmission frequency of the vehicle spotlight notification changes dynamically based on at least the position of a pedestrian, vehicle operating conditions, current direction of travel of the vehicle, the predicted path of the vehicle and positions of relevant objects in the vicinity of the vehicle.

12. The multimodal system of claim 11, wherein the visual notification includes at least a projected vehicle path notification projected by the image projection system, the projected vehicle path notification indicating to the pedestrian the predicted path of the vehicle, a visual opening door indicator and a visual danger zone indicator.

13. The multimodal system of claim 12, wherein the visual notification changes dynamically based on at least the speed of the vehicle, the vehicle operating conditions, the current direction of travel of the vehicle, the predicted path of the vehicle and positions of relevant objects in the vicinity of the vehicle.

14. The multimodal system of claim 9, wherein the vehicle information system configured to determine the operating conditions of the vehicle is further configured to scan vehicle surrounding conditions using the plurality of vehicle sensors.

15. The multimodal system of claim 9, wherein the vehicle information system configured to determine the operating conditions of the vehicle is further configured to obtain at least one of Vehicle to Infrastructure (V2I) information, Global Positioning System (GPS) navigational-type data, and traffic information.

16. The multimodal system of claim 9, wherein the vehicle information system configured to determine whether the notification of the pedestrian is necessary is further configured to determine whether the predicted path of the vehicle intersects with a path of the pedestrian using the determined vehicle operating conditions and the acquired pedestrian parameters and configured to determine whether the level of distractedness of the pedestrian exceeds a predefined threshold, in response to determining that the predicted path of the vehicle intersects with the path of the pedestrian.

* * * * *